United States Patent [19]
Hoffman

[11] 3,931,796
[45] Jan. 13, 1976

[54] HYDRAULIC COW CATCH-CARRIER

[76] Inventor: Herbert F. Hoffman, Platte, S. Dak. 57369

[22] Filed: Dec. 31, 1974

[21] Appl. No.: 537,662

[52] U.S. Cl................................. 119/151; 119/20
[51] Int. Cl.² ....................................... A01K 29/00
[58] Field of Search .......... 119/151, 20; 293/16, 36, 293/38, 39

[56] References Cited
UNITED STATES PATENTS

| | | | |
|---|---|---|---|
| 1,298,996 | 4/1919 | Milian | 293/16 |
| 3,095,858 | 7/1963 | Bauer | 119/151 |

*Primary Examiner*—Hugh R. Chamblee

[57] ABSTRACT

A fully vehicle mounted hydraulic-actuated cow catch-carrier having a frame mountable cantilever fashion on a vehicle and including a back wall arrangeable adjacent and transverse to the vehicle and spaced, substantially side walls extending substantially perpendicularly from transverse ends of the back wall. A pair of gates are pivotally mounted each on a respective one of the side walls at points thereon spaced from the back wall and arranged for being independently swung by, advantageously, hydraulic motors into planes substantially parallel to the back wall for forming an enclosure in conjunction with the back and side walls. The frame is preferably provided with a floor arranged for receiving an animal gathered by the gates with the floor being arranged forming a bottom to the aforementioned enclosure. The floor is advantageously movable relative to the frame for being lowered to ground level in order to facilitate loading of an animal onto the floor, or platform, by means of the hydraulically powered gates. This movable floor also serves as a jack for facilitating attachment of the frame to and removal from the front end of a pickup truck, or similar vehicle.

16 Claims, 10 Drawing Figures

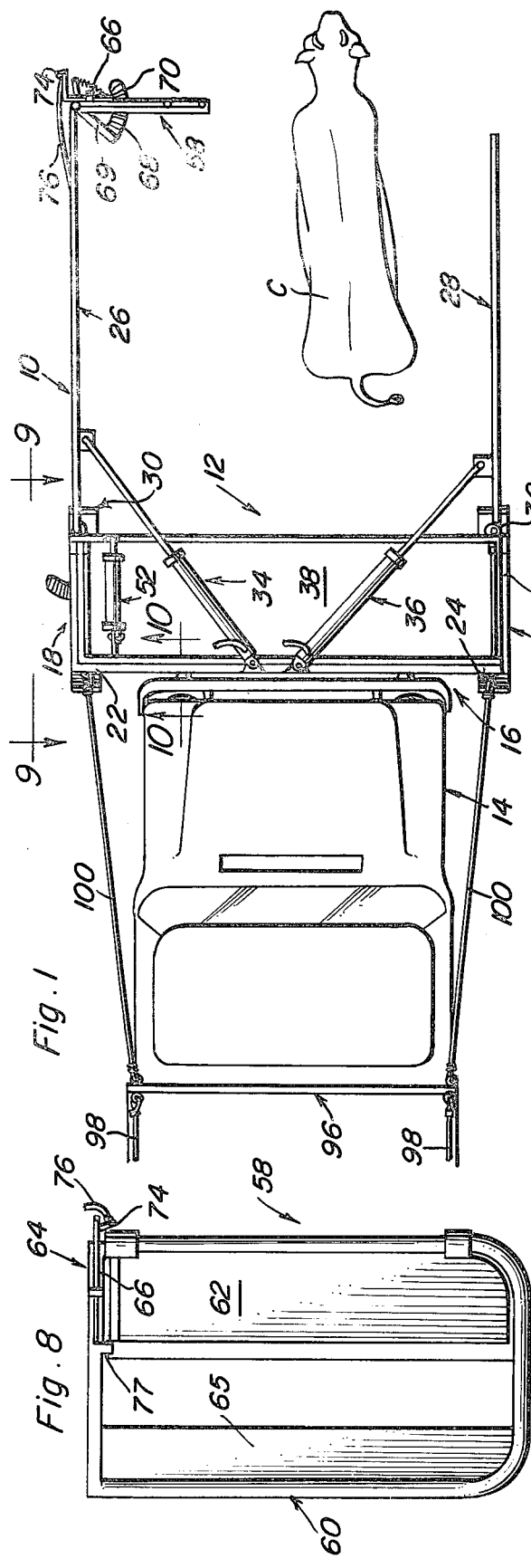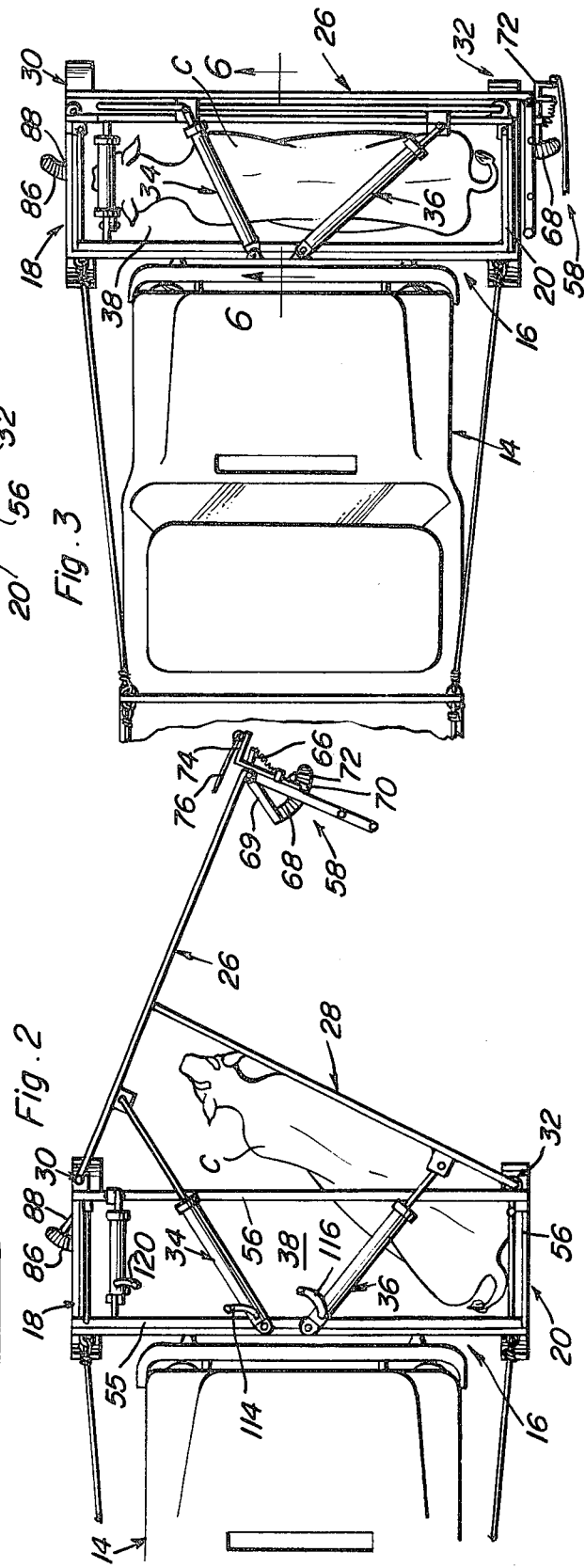

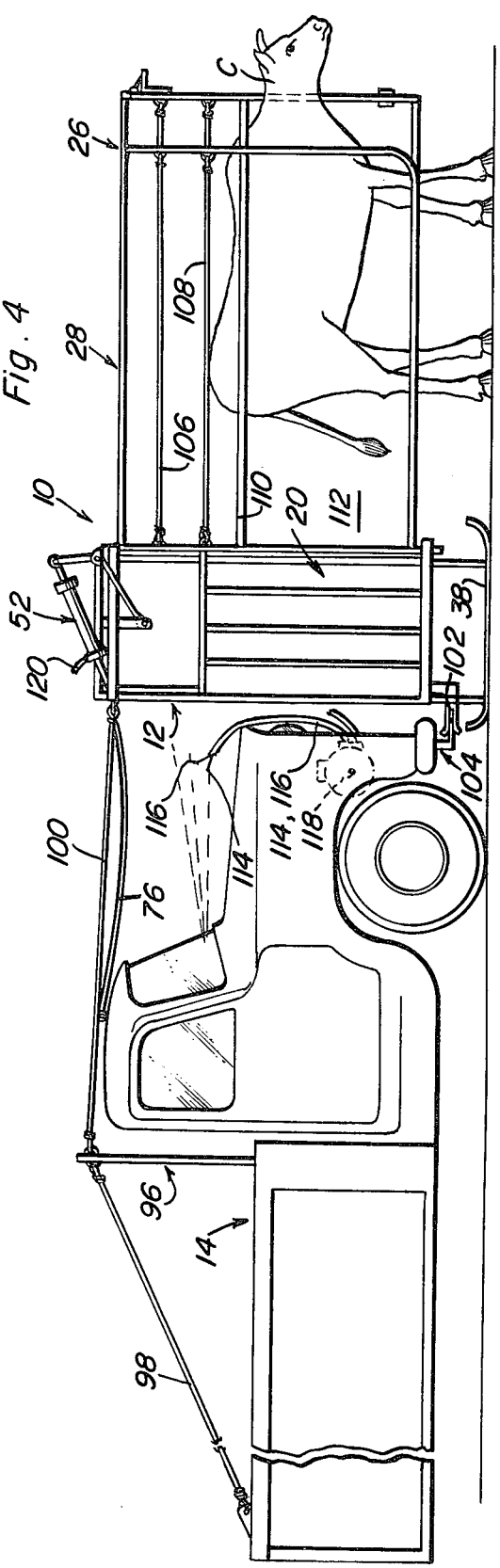
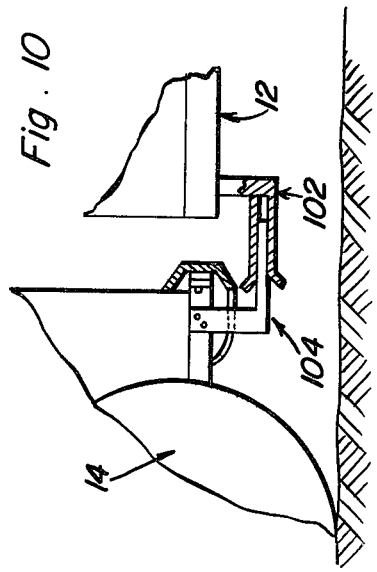
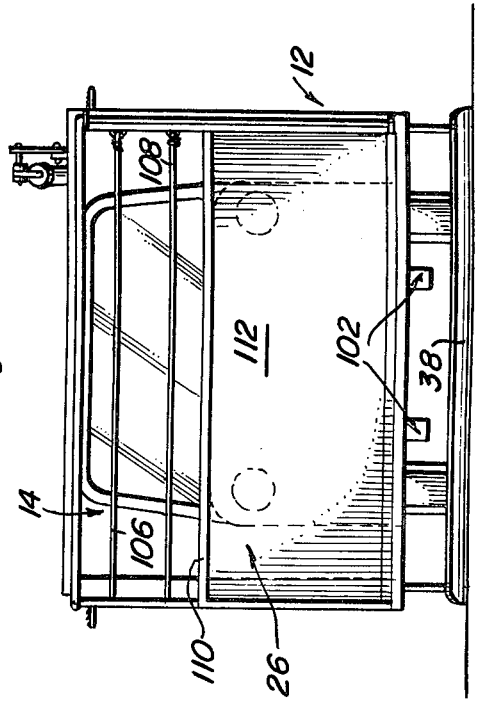

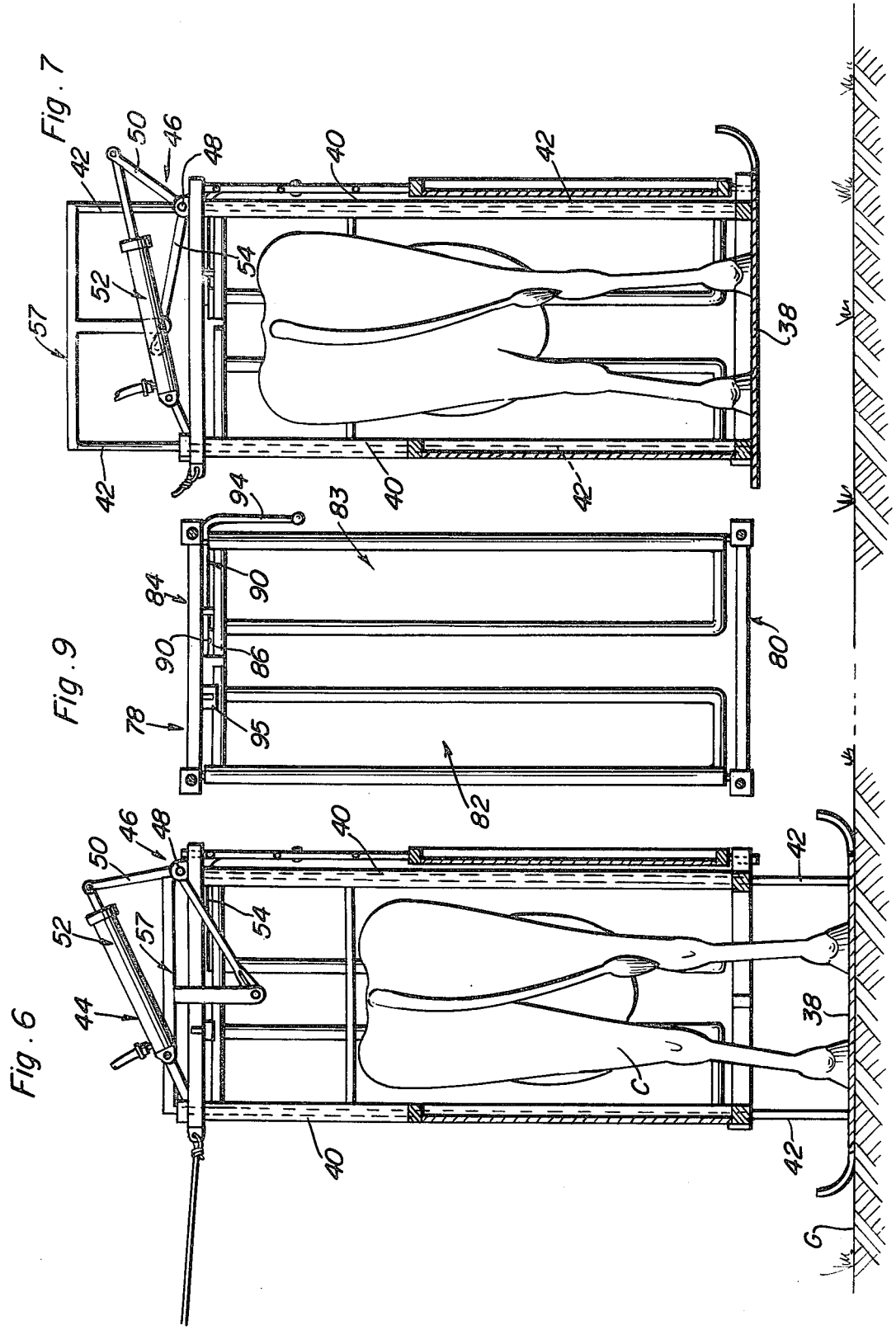

HYDRAULIC COW CATCH-CARRIER

BACKGROUND OF THE INVENTION

1. Field of the Invention

This invention relates generally to a device for gathering and carrying an animal for the purpose of transporting sick or troubled animals, and particularly to a fully vehicle mounted hydraulic-actuated animal catch-carrier.

2. Description of the Prior Art

It is frequently desirable to catch cattle and similar livestock, such as sheep, when the animals are out on range land and to transport the animals to a pertinent site. This is particularly the case when animals are discovered to be sick or injured, or the like, and must be given veterinary treatment. Toward this end, it has been proposed to provide animal catching devices such as shown in U.S. Pat. No. 3,095,858, issued July 2, 1963 to Oscar E. Bauer. This known device, which is pivotally mounted to the front end of a motor vehicle and partially supported by self-contained wheels, surrounds and encloses suitable range animals while the animals remain in standing or running position on the ground. Thus, while this known device is capable of surrounding and enclosing animals, it does not provide for subsequently transporting the captured animals.

Other prior patents believed pertinent to the present invention are as follows:

| | |
|---|---|
| 1,298,996 | Apr. 1, 1919 |
| 2,729,196 | Jan. 3, 1956 |
| 3,785,349 | Jan. 15, 1974 |

SUMMARY OF THE INVENTION

It is an object of the present invention to provide an animal catching device that permits subsequent transport of animals caught.

It is another object of the present invention to provide an animal catching and carrying device that is simple, yet rugged in construction, quiet in operation, and easy to manipulate and operate.

It is still another object of the present invention to provide an animal catching and carrying device that has power-operated elements controllable by a driver of a vehicle with which the catching and carrying device is associated.

These and other objects are achieved according to the present invention by providing a fully vehicle mounted hydraulic-actuated animal catch-carrier having: a frame mountable on a vehicle, the frame including a back wall arrangeable adjacent to and transverse of the vehicle and spaced, substantially parallel side walls extending substantially perpendicularly from transverse ends of the back wall; a pair of gates pivotally mounted each on a respective one of the side walls at points thereon spaced from the back wall, the gates arranged for swinging into substantially parallel planes themselves substantially parallel to the back wall for forming an enclosure in conjunction with the side walls and back wall; and preferably hydraulic motors mounted on the frame and connected to the gates for selectively and independently swinging the gates into and out of the substantially parallel planes.

The frame is preferably provided with a floor, or platform, arranged for receiving an animal gathered by the gates, with the floor being arranged forming a bottom to the aforementioned enclosure. The frame further advantageously includes one or more sleeves disposed parallel to the side and back walls and perpendicular to the floor. Each sleeve thus provided is furnished with a longitudinally extending member, such as a rod, slidably arranged in the sleeve and connected to the floor for supporting same. The end of the longitudinally extending member spaced from the end affixed to the floor is advantageously connected to an actuator arrangement which permits selective sliding of the longitudinally extending member relative to its associated sleeve and moving the floor toward and away from the sleeve. In this manner, the longitudinally extending member may be arranged for lowering the floor to ground level in order to facilitate loading and unloading of an animal caught by the aforementioned gates on the floor and within the enclosure before and after transporting the captured animal. Further, the floor may be employed for jacking up the frame by engagement of the floor with the ground or other supporting surface.

According to an advantageous feature of the present invention, a head gate is pivotally mounted on one of the gates at the outermost, or free, end thereof, and is arranged for swinging toward and away from the associated one of the gates for facilitating gathering and holding of an animal. Further, one of the frame side walls is advantageously in the form of a normally-closed further head gate arranged for selectively opening and permitting an animal previously captured to leave the enclosure formed by the frame, gate, and floor.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary, schematic, top plan view showing an animal catch-carrier according to the present invention mounted on a motor vehicle and in the initial stages of catching an animal.

FIG. 2 is a fragmentary, schematic, top plan view, similar to FIG. 1, but showing the animal catch-carrier according to the present invention in the process of loading a captured animal for transport by the device.

FIG. 3 is a fragmentary, schematic, top plan view, similar to FIGS. 1 and 2, but showing a captured animal loaded on the carrier portion of the present invention for transport to a predetermined location.

FIG. 4 is a fragmentary, schematic, side elevational view showing the present invention subsequent to the catching of an animal, but prior to loading of the animal for transport.

FIG. 5 is a schematic, front elevational view, showing the present invention as seen in FIG. 3 of the drawings, but with the animal removed for clarity.

FIG. 6 is a sectional view taken generally along the line 6—6 of FIG. 3, but drawn to a larger scale than FIG. 3.

FIG. 7 is a sectional view similar to FIG. 6, but showing certain elements in a different position than shown in FIG. 6.

FIG. 8 is a front elevational, detail view showing an animal self-catch head gate according to the present invention.

FIG. 9 is a front elevational, detail view similar to FIG. 8, but showing yet another head gate according to the present invention.

FIG. 10 is a fragmentary, schematic, sectional view taken generally along the line 10—10 of FIG. 1.

DESCRIPTION OF THE PREFERRED EMBODIMENTS

Referring now more particularly to FIGS. 1 through 5 of the drawings, an animal catch-carrier 10 according to the present invention has a frame 12 mountable cantilever-fashion on a vehicle 14 in a manner to be described in greater detail below. Frame 12 includes a back wall 16 arrangeable adjacent to and transverse of the, for example, front end of a suitable vehicle 14 such as a conventional pickup truck, and the like. Spaced, substantially parallel side walls 18 and 20 extend substantially perpendicularly from transverse ends 22 and 24 of back wall 16 to form in conjunction with back wall 16 three walls of an enclosure.

A pair of gates 26 and 28 are pivotally mounted each on a respective one of the side walls 18 and 20 at points thereof spaced from back wall 16. Gates 26, 28 are arranged for swinging about, for example, conventional hinges 30 and 32, respectively, into planes substantially parallel to the plane of back wall 16 for forming in conjunction with back wall 16 and side walls 18 and 20 the aforementioned enclosure. Conventional linear fluid motors 34 and 36, which are preferably hydraulic motors, are advantageously pivotally mounted to suitable portions of frame 12 in a conventional manner and pivotally connected to gates 26 and 28, respectively, at points thereof spaced from hinges 30 and 32, respectively, for selectively and independently swinging the gates 26, 28 into and out of the aforementioned positions substantially parallel to back wall 16.

Frame 12 is advantageously provided with a floor, or platform, 38 arranged for receiving an animal, such as the steer designated C, gathered by gates 26 in a manner to be described below. As perhaps can best be seen from FIG. 3 of the drawings, floor 38 is also arranged forming a bottom to the aforementioned enclosure formed by gates 26 and 28 and walls 16, 18, and 20.

Referring now in particular to FIGS. 6 and 7 of the drawings, frame 12 further includes at least one, and preferably the illustrated plurality, of sleeves 40 disposed parallel to walls 16, 18, and 20 and perpendicular to floor 38. It has been found convenient to provide frame 12 with the illustrated four sleeves 40, one sleeve 40 arranged at each corner of the substantially rectangular frame 12. Longitudinally extending members, advantageously in the form of rods 42, are slidably arranged in respective sleeves 40 and connected, or affixed in a conventional manner, to floor 38 for supporting floor 38. The ends of rods 42 spaced longitudinally from those ends of rods 42 affixed to floor 38 are advantageously connected to an actuator arrangement 44 which permits selective sliding of rods 42 relative to sleeves 40 in order to move floor 38 toward and away from the sleeves 40. In this manner, rods 42 may be positioned relative to sleeves 40 for causing floor 38 to engage the ground G, or other supporting surface, as shown in FIG. 6 in order to facilitate loading and unloading of animal C onto and off of floor 38, as well as to facilitate attachment and disattachment of frame 12 from the associated vehicle 14 by using floor 38 as a jack in a manner to be described in greater detail below.

Arrangement 44 advantageously includes a rocker 46 pivotally mounted on frame 12 as by pins 48 and having a one crank 50 connected to rod 42. Arrangement 44 further includes a conventional linear fluid motor 52, which is advantageously a hydraulic motor similar to motors 34 and 36, pivotally connected in a conventional manner to frame 12 and to the other crank 54 of rocker 46 for selectively pivoting rocker 46 and moving rods 42 relative to sleeves 40. Connection of crank 54 to rods 42 is advantageously effected by a pair of transversely oriented bars 55 (FIG. 2) connected directly to an associated pair of rods 42 and connected together as by the cross member 56 and the T-element 57. Crank 54 is pivotally connected at the free end thereof to the lower, or downward, end of the stem of element 57. As will be readily appreciated from FIGS. 6 and 7 of the drawings, movement of rocker 46 about pin 48 will cause rods 42 to be raised and lowered within their associated sleeves 40.

FIG. 8 shows in detail a head gate 58 which is advantageously mounted on one of the gates 26, 28 so as to extend perpendicularly therefrom. As illustrated, said gate 58 is affixed to the outermost, or free, end of gate 26. This arrangement of head gate 58 facilitates gathering and holding of an animal C, and includes a gate frame 60, a gate element 62 pivotally mounted on gate frame 60, and a ratchet catch 64 affixed to gate element 62 for selectively retaining gate element 62 in a position within gate frame 60. A panel 65 is mounted within frame 60 spaced from gate element 62 for forming a stanchion-like gate assembly. Further, gate element 62 is spring-loaded by the provision of a, for example, conventional coiled tension spring 66 mounted between a lug provided on gate element 62 and an off-center point on frame 60. Ratchet catch 64 includes a conventional ratchet plate 68 affixed to gate element 62 as by brace arms 69. A detent 70 provided on the outer end of a pivotally mounted crank 72 is arrangeable engaging ratchet plate 68 in a known manner to provide the desired ratchet action. The arm 74 of crank 72 permits the crank to be rotated in order to engage and disengage detent 70 from the ratchet plate 68, and this arm 74 is advantageously swung from engaged to disengaged positions, for example, by means of a cable 76 which is connected to arm 74 preferably adjacent the outermost end thereof and is extended back along gate 26 and frame 12 to the cab area of vehicle 14 where the cable may be pulled by an operator (not shown) of vehicle 14. Advantageously, a stop 77 is provided on frame 60 for limiting movement of gate element 62 in the direction of the bias exerted on gate element 62 by spring 66. The arrangement of stop 77 is such that gate element 62 will be stopped from swinging away from frame 12; that is, gate element 62, which is advantageously formed from a sheet, or panel, arranged within a hinged frame, will pivot towards an animal surrounded by gates 26 and 28.

FIG. 9 of the drawings shows a normally-closed further head gate advantageously arranged forming the side wall 18 of frame 12, that being the left hand side of frame 12 as the device is viewed in top plan, for selectively opening and permitting an animal to leave the enclosure formed by the various walls of the frame and the gates 26 and 28. This head gate 78 includes a framework 80, a pair of cooperating gate parts 82 and 83 pivotally mounted on framework 80 as by suitable hinges, release a ratchet stop 84 mounted on one of the gate parts, part 83 being illustrated as so provided, for selectively retaining gate part 83 within framework 80. Ratchet stop 84 advantageously includes a conventional ratchet plate 86 mounted on gate part 83 as by a brace arm 88. A catch 90 provided on one end of a crank 92 is arranged for selectively engaging ratchet plate 86 and forming a ratchet mechanism therewith. Handle 94 of crank 92 may be moved as by hand to selectively release the aforementioned ratchet mechanism and permit gate part 83 to open and release a, for example, animal C from within the enclosure formed by the walls of frame 12 in conjunction with the gates 26 and 28. A suitable latch 95 may be employed to lock gate part 82 within framework 80 — that is, in the plane of framework 80 — so that gate parts 82 and 83 may cooperate to form a stanchion-like head gate. The unidirectional movement permitted to gate part 83 by ratchet stop 84 will permit the animal C to engage the head thereof between the gate parts 82 and 83, which latter parts are advantageously constructed in a manner similar to gate element 62 of head gate 58. It will be appreciated that head gate 58 functions in a manner similar to head gate 78, with the exception that panel 65 of head gate 58 is not hinged to its associated frame in a like manner as gate part 82, since it is not intended that head gate 58 be opened in order to permit an animal C to pass through head gate 58 as is the intention of head gate 78.

Frame 12 is advantageously mounted on the front end of a pickup truck, and the like, as by a truss 96, perhaps best seen in FIG. 4, guyed to the bed of the truck, or vehicle 14, by cables 98 and connected to the upper portion of back wall 16 of frame 12 as by a pair of cables 100. As is best seen in FIG. 10 of the drawings, a pair of guides 102 are cantilever mounted at the bottom portion of frame 12 for receiving mating brackets 104 mounted adjacent the bumper of vehicle 14. It will be readily appreciated from the drawings that this arrangement will quickly and rigidly attach frame 12 to the vehicle 14. Further, lowering of floor 38 to the position shown in FIGS. 4 and 5 of the drawings will cause floor 38 and the rods 42 supporting same to be used in the manner of a jack which facilitates attachment and disattachment of frame 12 to vehicle 14.

Reference numerals 106 and 108 represent a pair of spaced, substantially parallel cables stretched between opposed portions of the framework forming gate 26 for assisting in closing gate 26 to prevent an animal C from getting through the gate while permitting an operator (not shown) of vehicle 14 to see ahead of the vehicle when gate 26 is in its closed, FIG. 3, position. Further, a bar 110 may be used to reinforce gate 26 and support in part a sheet 112 forming the bottom half of gate 26. In this manner, an advantageous construction of gate 26 is achieved wherein the driver of vehicle 14 has vision sufficient for operation of the vehicle while gate 26 effectively retains an animal C within the enclosure partially formed by gate 26.

Referring again to fluid motors 34 and 36, it will be readily appreciated from, for example, FIGS. 1 through 3 of the drawings, that motor 34 is pivotally connected to gate 26 at a point thereof spaced from hinges 30 and pivotally mounted on an appropriate portion of frame 12, while motor 36 is pivotally connected to both gate 28 and frame 12. Each of the motors 34 and 36 is arranged for operation independently from the other fluid motor 36, 34. Suitable hoses 114 and 116 are advantageously connected to motors 34 and 36, respectively, and to a conventional pump 118, FIG. 4, which supplies a suitable working fluid, such as a conventional hydraulic fluid, under pressure to the motors 34 and 36. In a similar manner, a hose 120 is connected to motor 52 and pump 118. Since the specific connections of the various hoses connecting a fluid pump and conventional fluid motors is well known to those skilled in the pertinent art, the connection of the various hoses between pump 118 and motors 34, 36, and 52, will not be described in greater detail herein.

As can be appreciated from the above description and from the drawings, gates 26 and 28 will be positioned by an operator of vehicle 14 as shown in FIG. 1 and vehicle 14 maneuvered so that gates 26 and 28 will encompass an animal C to be caught. It will be appreciated that at this stage gate element 62 of head gate 58 will be locked in a position slightly out of the plane of frame 60 so that once caught within gates 26 and 28, the position shown in FIG. 4 of the drawings, the vehicle operator will be able to release gate element 62 by pulling on cable 76 and permit animal C to withdraw its head from between gate element 62 and panel 65. It will be appreciated that animal C would cause itself to be retained between the two aforementioned elements by means of the unidirectional movement permitted by bracket catch 64 against the bias of spring 66. Once the animal C is released from head gate 58, gates 26 and 28 may be closed as shown in FIG. 2, by means of appropriate actuation of motors 34 and 36, so as to force animal C onto floor 38. Of course, once animal C has been caught between gates 26 and 28, vehicle 14 will be brought to a stop and floor 38 will be lowered to the position shown in FIG. 4 of the drawings by appropriate actuation of motor 52 from the cab of vehicle 14. Thus, animal C will be easily forced onto floor 38 as gates 26 and 28 close to the position shown in FIG. 3 of the drawings. Now floor 38 may be raised, again by appropriate actuation of motor 52, to the position of floor 38 shown in FIG. 7 of the drawings. Animal C is now safely loaded into the enclosure formed by the walls of frame 12, floor 38, and gates 26 and 28 for transport to a desired location. The device according to the invention now functions as a carrier, whereas it previously functioned as a catching device. It is the cooperation of the same set of elements, however, that permits these dual functions to be performed in their appropriate sequence by the same basic set of structural elements.

Once animal C has been transported to whatever location desired, vehicle 14 will once again be brought to a stop, floor 38 lowered to the position shown in FIG. 4, and crank 92 rotated by manual manipulation, for example, of handle 94 to release the ratchet stop 84 while simultaneously unlocking latch 95 in order to open head gate 78 and permit animal C, who previously may have engaged its head between gate parts 82 and 83, to walk out of the previously mentioned enclosure.

It will also be appreciated that by arrangement of the head gates 58 and 78 on the same side of catch-carrier 10, it will be reasonably assured that the head of an animal C being caught and carried will be oriented in the proper direction relative to frame 12. That is, once the head of animal C is engaged by head gate 58, the animal will be retained in, for example, leftward orientation (FIG. 2) and will be brought onto floor 38 so as to face head gate 78 (FIG. 3).

It is desirable that left side wall 18, or more specifically head gate 78, be mounted on the remainder of frame 12, or more specifically back wall 16, as by suitable, known ball hitches, not shown in detail, in order to facilitate mounting and dismounting of head gate 78. It is also desirable to employ the runner-type transverse section to floor 38 in order to enhance use of floor 38 as a jack. As can best be seen from FIG. 3, head gate 58 will come across the right side wall 20 when gate 26 is folded across frame 12 for completing the enclosure formed in conjunction with frame 12 so as to assure that an animal C cannot back out of the enclosure through side wall 20.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention.

What is claimed as new is as follows:

1. An animal catch-carrier, comprising, in combination:
   a. a frame mountable on a vehicle, the frame including a back wall arrangeable adjacent to and transverse of the vehicle and spaced, substantially parallel side walls extending substantially perpendicularly from transverse ends of the back wall;
   b. a pair of gates pivotally mounted each on a respective one of the side walls at points thereof spaced from the back wall, the gates arranged for swinging into planes substantially parallel to one another and to the back wall for forming an enclosure with the side walls and back wall; and
   c. motor means mounted on the frame and connected to the gates for selectively swinging the gates into and out of the substantially parallel planes.

2. A structure as defined in claim 1, wherein the frame is provided with a floor arranged for receiving an animal gathered by the gates, the floor being also arranged forming a bottom to the enclosure.

3. A structure as defined in claim 2, wherein the frame further includes a sleeve disposed parallel to the walls of the frame and perpendicular to the floor, a longitudinally extending member slidably arranged in the sleeve and connected to the floor for supporting same, and actuator means connected to the longitudinally extending member for selectively sliding the longitudinally extending member relative to the sleeve and moving the floor toward and away from the sleeve, the longitudinally extending member thus being arrangeable for jacking up the frame by engagement of the floor with a support surface.

4. A structure as defined in claim 3, wherein the actuator means includes a rocker pivotally mounted on the frame and having one crank connected to the longitudinally extending member, and further including a linear fluid motor pivotally connected to the frame and to the other crank of the rocker for selectively pivoting the rocker and moving the longitudinally extending member relative to the sleeve.

5. A structure as defined in claim 4, wherein a head gate is mounted on one of the gates and arranged for facilitating gathering and holding of an animal.

6. A structure as defined in claim 5, wherein the head gate includes a gate frame, a gate element pivotally mounted on the gate frame, and a ratchet catch means mounted on the gate element and the gate frame for selectively limiting movement of the gate element in a predetermined single direction.

7. A structure as defined in claim 6, wherein one of the side walls is a normally-closed further head gate arranged for selectively opening and permitting an animal to leave the enclosure.

8. A structure as defined in claim 7, wherein the further head gate includes a framework, a pair of cooperating, spaced gate parts pivotally mounted on the framework, and a ratchet stop means mounted on one of the gate parts for selectively, and normally, limiting swinging movement of the associated gate part in a single, predetermined direction.

9. A structure as defined in claim 8, wherein the motor means includes a pair of separate fluid motors both pivotally mounted on the frame, one of the fluid motors connected to a respective one of the gates and the other of the fluid motors connected to the other of the gates, each of the fluid motors arranged for operation independently from the other of the fluid motors.

10. A structure as defined in claim 1, wherein a head gate is mounted on one of the gates and arranged for facilitating gathering and holding of an animal.

11. A structure as defined in claim 10, wherein the head gate includes a gate frame, a gate element pivotally mounted on the gate frame, and a ratchet catch means mounted on the gate element and the gate frame for selectively limiting movement of the gate element in a predetermined single direction.

12. A structure as defined in claim 11, wherein one of the side walls is a normally-closed further head gate arranged for selectively opening and permitting an animal to leave the enclosure.

13. A structure as defined in claim 12, wherein the further head gate includes a framework, a pair of cooperating, spaced gate parts pivotally mounted on the framework, and a ratchet stop means mounted on one of the gate parts for selectively, and normally, limiting swinging movement of the associated gate part in a single, predetermined direction.

14. A structure as defined in claim 1, wherein one of the side walls is a normally-closed head gate arranged for selectively opening and permitting an animal to leave the enclosure.

15. A structure as defined in claim 14, wherein the head gate includes a framework, a pair of cooperating, spaced gate parts pivotally mounted on the framework, and a ratchet stop means mounted on one of the gate parts for selectively, and normally, limiting swinging movement of the associated gate part in a single, predetermined direction.

16. A structure as defined in claim 1, wherein the motor means includes a pair of separate fluid motors both pivotally mounted on the frame, one of the fluid motors connected to a respective one of the gates and the other of the fluid motors connected to the other of the gates, each of the fluid motors arranged for operation independently from the other of the fluid motors.

* * * * *